(12) United States Patent
Nathan et al.

(10) Patent No.: US 12,384,599 B2
(45) Date of Patent: Aug. 12, 2025

(54) BAKEWARE STORAGE SYSTEM

(71) Applicant: Caraway Home, Inc., New York, NY (US)

(72) Inventors: Jordan Nathan, New York, NY (US); Bret Recor, San Francisco, CA (US); Benjamin Gross, San Francisco, CA (US); Kenneth Young, San Francisco, CA (US); Christoph Andrejcic, San Francisco, CA (US)

(73) Assignee: Caraway Home, Inc., New York, NY (US)

( * ) Notice: Subject to any disclaimer, the term of this patent is extended or adjusted under 35 U.S.C. 154(b) by 0 days.

(21) Appl. No.: 17/847,106

(22) Filed: Jun. 22, 2022

(65) Prior Publication Data
US 2022/0402653 A1    Dec. 22, 2022

Related U.S. Application Data

(60) Provisional application No. 63/213,315, filed on Jun. 22, 2021.

(51) Int. Cl.
*B65D 25/04* (2006.01)
*A47B 77/18* (2006.01)
(Continued)

(52) U.S. Cl.
CPC .............. *B65D 25/04* (2013.01); *A47B 77/18* (2013.01); *A47J 47/16* (2013.01); *B65D 25/2808* (2013.01)

(58) Field of Classification Search
CPC .... B65D 25/04; B65D 25/22; B65D 25/2808; A47J 47/00; A47J 47/16; A47J 47/18
See application file for complete search history.

(56) References Cited

U.S. PATENT DOCUMENTS 887,712 A    5/1908  Frank
2,672,232 A *  3/1954  Kessell, Jr. ............ A45C 11/20
                                                    220/521
(Continued)

FOREIGN PATENT DOCUMENTS

EP    2532596 A1    12/2012

OTHER PUBLICATIONS

Extended European Search Report of the European Patent Office in related European Patent Appl. No. 22829270.2, dated Mar. 26, 2025, 20 pages.

*Primary Examiner* — Andrew T Kirsch
(74) *Attorney, Agent, or Firm* — Bochner PLLC; Andrew D Bochner; Eric R Kleinertz

(57) ABSTRACT

Disclosed is a system for storing various bakeware items in an organized and efficient manner. The bakeware caddy may include a short divider orthogonal to a left wall, a right wall, and a bottom surface; and a long divider orthogonal to the short divider and the bottom surface. Accordingly, the caddy may comprise one or more pockets, for example a rear pocket, a left pocket, and a right pocket, formed by disposition of the one or more walls and dividers. A strap may be disposed on the outer circumference of the caddy, the strap comprising one or more ends magnetically engaged. Thus, reversible magnet adherence of the strap ends may enable withdrawal and placement of bakeware items within the caddy. The caddy and the components thereof may be composed of various materials to enable rigidity and support and may be further covered in fabric to prevent damage to the bakeware items.

20 Claims, 10 Drawing Sheets

(51) Int. Cl.
*A47J 47/16* (2006.01)
*B65D 25/28* (2006.01)

(56) References Cited

U.S. PATENT DOCUMENTS

| | | | | |
|---|---|---|---|---|
| 3,182,872 | A | * 5/1965 | Brosseau | A01K 97/06 |
| | | | | 206/315.11 |
| D659,632 | S | * 5/2012 | Jordan | D12/414.1 |
| 2001/0039807 | A1 | 11/2001 | Mogil | |
| 2009/0114690 | A1 | 5/2009 | Landay | |
| 2009/0159598 | A1 | * 6/2009 | Kuehneman | B65D 25/04 |
| | | | | 220/553 |
| 2010/0147861 | A1 | 6/2010 | Andochick | |
| 2016/0121642 | A1 | * 5/2016 | Herbst | B42F 13/26 |
| | | | | 220/4.23 |

* cited by examiner

BAKEWARE STORAGE SYSTEM

CLAIM OF PRIORITY

This application claims priority from U.S. Provisional Patent Application No. 63/213,315, filed on Jun. 22, 2021, the contents of which are incorporated herein by reference.

FIELD OF INVENTION

The invention is in the field of kitchen storage organizers, specifically systems for organizing various bakeware sets of different sizes, allowing for space saving and easy access.

INTRODUCTION

Modern day kitchens often include numerous items ("bakeware") used for both preparation and serving of baked goods. Due to varied baking needs, many kitchens include pots, pans, tins, and trays of various shapes and sizes, resulting in a need to store such bakeware.

Due to the constant use of bakeware, the varied layouts of kitchens in different homes, and the need for accessible and convenient bakeware, a multitude of bakeware storage systems have been attempted.

Conventional bakeware storage systems attempt to store bakeware to reduce the footprint and space needed. This is particularly beneficial in scenarios where kitchens are small, such as apartments in urban settings. However, even with reduced footprints, conventional bakeware storage systems are seldom efficient. Specifically, most traditional bakeware pieces are manufactured in a multitude of shapes and sizes. For example, baking sheets are generally flat and rectangular, cake pans may be circular, and muffin pans may have flat tops and multiple cylindrical protrusions. Essentially, there is great difficulty in organizing bakeware pieces, as these pieces are incongruent and fail to nest easily. Moreover, considering many of these bakeware pieces are sized for recipes utilizing standardized volumes and shapes, simply reshaping the pieces to be more stackable would be impractical.

Additionally, durability and reliability, in addition to efficiency and ease-of-use, have proven to be a long-standing issue in bakeware storage. Conventional wire storage racks suffer from warping, stretching and bending, and are unable to hold significant amounts of weight. Moreover, conventional wire storage racks often scratch the bakeware, causing degradation and removal of any coating, while also damaging the aesthetic of the product. Additionally, wire storage systems still do not resolve the problem of storage efficiency, instead merely stacking bakeware on the units as shelves.

Often, stacking bakeware does not actually solve storage for users, it causes bigger problems. For example, in an eight-piece bakeware stack, if a user wants the piece second from the bottom, the user needs to pull all the bakeware pieces out of the cabinet, then remove many pieces to get to the desired piece. Since bakeware shapes have very particular sizes that are standardized by most popular recipes and baking mixes, the sizes for each type of shape in the market creates a situation where the standard baking set cannot accommodate a perfect nest amongst pieces due to the rigid dimensions of said bakeware pieces. Thus, storing bakeware becomes an even larger challenge since no set can fully nest. Moreover, this makes pieces at the top likely to fall or forces the user to use more cabinet space to fit all pieces. This leads the user to opt for space-wasting options or else sacrifice ease of access to readily obtain the intended bakeware item. Additionally, bakeware pieces are large and long, and have many shapes including squares, rectangles, and circles. These varying shapes make such items both hard to nest and store together. This may result in an inability to utilize cabinet space efficiently.

Thus, it would be desirable to provide systems and devices for providing efficient storage for bakeware and encourage easy access of bakeware. It would be further desirable to provide systems and devices for efficient storage in a reduced footprint.

Systems and devices for storage of bakeware that are modular, customizable, reliable and durable, in order to fit any kitchen cabinet size or structure, or to orient in any way a user may see fit may prove preferable to the user of bakeware items.

Therefore, systems and devices incorporating such advantageous features are hereby provided.

SUMMARY

The invention may be a bakeware storage caddy, where the caddy comprises a left wall and a right wall, where the left wall and the right wall are parallel to each other, and where the right wall and left wall are joined by a front wall and rear wall. The front wall may be lesser in height than the rear wall. A first juncture may be formed by the left wall and rear wall and a second juncture may be formed by the right wall and rear wall. A third juncture may be formed by the left wall and front wall and a fourth juncture may be formed by the right wall and front wall. The rear wall and front wall may sit perpendicular to the left and right walls. Further, a short divider may sit orthogonal to the left wall, the right wall, and the bottom surface, closer to the distal end of the caddy. In an embodiment, a long divider sits orthogonal to the short divider and the bottom surface, where the short divider has a lesser length than the long divider. In a further embodiment, the long divider may taper from the short divider to the front wall. A rear pocket may be formed from the joining of the left wall, the right wall, the bottom surface, the rear wall, and the short divider. Further, the rear pocket may form a rectangular cuboid shape, complete with six sides, where one side is open to the atmosphere. A strap may traverse the front opening, one or more magnets may enable the opening and closing of the strap. The strap may have vertical stitches and horizontal stitches along the portion of the strap traversing the right and left walls to secure the strap to the caddy and enable engagement and disengagement of the strap ends (for example, permitting access to the caddy).

In a further embodiment, the left pocket comprises a left pocket volume and the right pocket comprises a right pocket volume, and the left pocket volume and the right pocket volume are equal. The short divider may be disposed in proximity to a distal end of the caddy, wherein the rear pocket may comprise a rear pocket volume, and wherein the rear pocket volume may comprise no less than 20% of a caddy volume. The left wall and the right wall may comprise a thickness greater than that of the short divider. In an embodiment, the caddy further comprises a rear loop formed by the strap and the rear wall. The strap may be secured to the caddy with a number of vertical stitches and a number of horizontal stitches along the portion of the strap traversing the right and left walls. In one embodiment, the right pocket and the left pocket are greater than eight inches in length, and the rear pocket is greater than three inches in length and five inches in width.

In a further embodiment, the caddy may comprise a left wall and a right wall, where the left wall and the right wall are parallel to each other, and where the right wall and left wall are joined by a front wall and rear wall. The front wall may be lesser in height than the rear wall. A first juncture may be formed by the left wall and rear wall and a second juncture may be formed by the right wall and rear wall. The rear wall and front wall may sit perpendicular to the left and right walls. Further, two long dividers may sit perpendicular to the front wall and rear wall, within the left wall and right wall. The first long divider may sit at the vertical bisection of the rear wall and front wall and a second divider may sit equidistant from the first long divider and the right wall. The first long divider and second long divider may form three pockets. The left pocket may be formed by the left wall, first long divider, rear wall, and front wall. The center pocket may be formed by the first long divider, second long divider, rear wall, and front wall. The right pocket may be formed by the second long divider, right wall, rear wall, and front wall.

In an embodiment, the left wall and the right wall comprise a greater thickness than that of the first long divider and the second long divider. The strap may be secured to the caddy with a number of vertical stitches and a number of horizontal stitches along the portion of the strap traversing the right and left walls.

In an embodiment, the left pocket, the center pocket, and the right pocket comprise a left pocket volume, a center pocket volume, and a right pocket volume, respectively, and the left pocket volume is greater than the center pocket volume and the right pocket volume. Further, the center pocket volume and the right pocket volume may be equal.

Additional aspects related to this disclosure are set forth, in part, in the description which follows, and, in part, will be obvious from the description, or may be learned by practice of this disclosure.

It is to be understood that both the foregoing and the following descriptions are exemplary and explanatory only and are not intended to limit the claimed disclosure or application thereof in any manner whatsoever.

BRIEF DESCRIPTION OF THE FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

Figure 1:
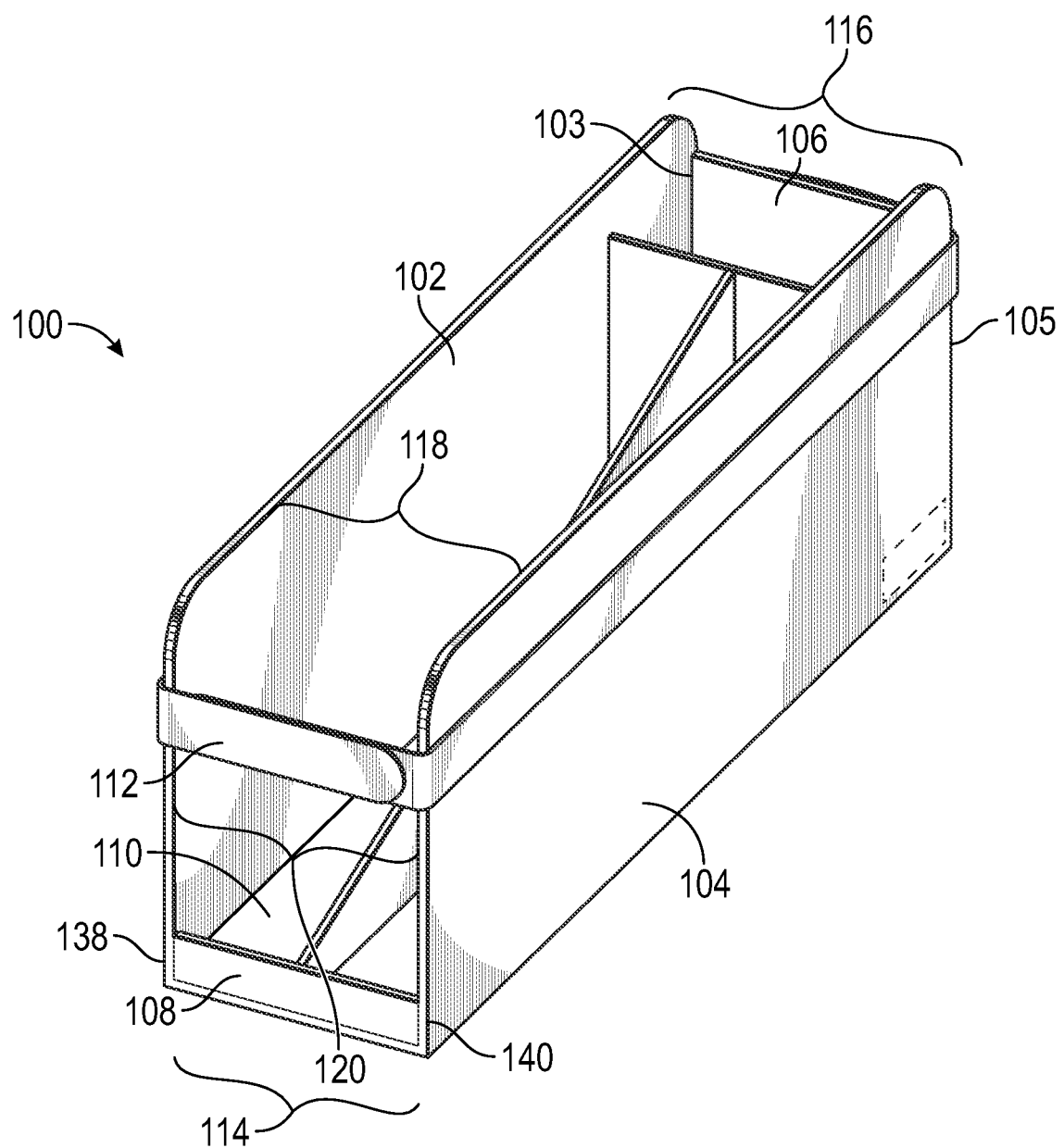
FIG. 1 is a top, front, right elevated side perspective view of a first embodiment of a bakeware storage caddy.

In the following detailed description, reference will be made to the accompanying drawing(s), in which identical functional elements are designated with like numerals. The aforementioned accompanying drawings show by way of illustration, and not by way of limitation, specific aspects, and implementations consistent with principles of this disclosure. These implementations are described in sufficient detail to enable those skilled in the art to practice the disclosure and it is to be understood that other implementations may be utilized and that structural changes and/or substitutions of various elements may be made without departing from the scope and spirit of this disclosure. The following detailed description is, therefore, not to be construed in a limited sense.

It is noted that description herein is not intended as an extensive overview, and as such, concepts may be simplified in the interests of clarity and brevity.

All documents mentioned in this application are hereby incorporated by reference in their entirety. Any process described in this application may be performed in any order and may omit any of the steps in the process. Processes may also be combined with other processes or steps of other processes.

Disclosed herein are systems and devices for bakeware storage (the "system"). In an embodiment, the system provides a space-saving benefit. Further disclosed is a novel system and device that avoids the need for stackable solutions, which are inefficient, time consuming, and lead to frustration. Additionally, such a system may increase the lifespan of bakeware products and prevent damage to the products' aesthetic appearance.

In an embodiment, the invention of the present disclosure is a bakeware system. The bakeware system may be configured to store a user's bakeware without the need for stacking. In another embodiment, the bakeware system may function as a drying rack. In an embodiment, the bakeware system is comprised of caddies configured to store each bakeware piece in an upright position (for example, to minimize the footprint of the bakeware system in a cabinet). In such an embodiment, the upright arrangement of bakeware may more efficiently utilize vertical space in a cabinet, while imposing a smaller horizontal footprint. The bakeware system may be sized for utilization in standard cabinets (for example, cabinets that are 24 inches deep). However, the storage system may be sized for a variety of cabinets, counter tops, and pantries.

Referring to FIGS. 1-5, the caddy 100 may include a left wall 102, a right wall 104, a rear wall 106, a front wall 108, and a bottom surface 110. In another embodiment, the caddy 100 also includes a strap 112. In an embodiment, the caddy 100 has a proximal end 114 and a distal end 116. As a non-limiting example, the rear wall 106 may be disposed on the distal end 116 of the caddy 100. Accordingly, the distal end of the right wall 104 and the distal end of the left wall 102 may be joined by the rear wall 106. The right wall 104 and the left wall 102 may include rounded edges or corners. For example, the distal and proximal top edges of the left wall 102 and the right wall 104 may be rounded to enable unobstructed placement and withdrawal of bakeware items within the caddy 100. Accordingly, said rounded edges may be less jagged and, thus, less likely to cause snags (as opposed to a sharp ninety-degree corner) when depositing bakeware items within the caddy 100. In an embodiment, the left wall 102 and the rear wall 106 meet perpendicularly to form a first juncture 103. In a further embodiment, the right wall 104 and the rear wall 106 meet perpendicularly to form a second juncture 105. The first juncture 103 and second juncture 105 may fasten the rear wall 106 to the left wall 102 and right wall 104. In a further embodiment, the left wall 102 and the front wall 108 may meet perpendicularly to form a third juncture 138. The right wall 104 and the front wall 108 may meet perpendicularly to further form a fourth juncture 140. The third juncture 138 and the fourth juncture 140 may meet perpendicularly to fasten the front wall 108 to the left wall 102 and the right wall 104. The junctures, as formed by orthogonal walls, may provide rigid support to the caddy 100.

In an embodiment, a front wall 108 is disposed on the proximal end 114 of the caddy 100 and may join the proximal ends of the left wall 102 and the right wall 104. The front wall 108 may be substantially shorter than the rear wall 106, the left wall 102, and/or the right wall 104. As a non-limiting example, the front wall 108 may be roughly 10% the height of the rear wall 106, the left wall 102, and/or the right wall 104. Alternatively, the caddy 100 may not include a front wall 108. The front wall 108 may be sized and adapted to retain bakeware items within the caddy (for example, to prevent such items from sliding out of the caddy 100), yet may be unobtrusive enough as to enable withdrawal and deposit of bakeware items within the caddy.

A top gap 118 may be formed between the top portion of the left wall 102 and the top portion of the right wall 104. A front gap 120 may be formed between the proximal ends of the left wall 102 and the right wall 104. In an embodiment, the top gap 118 and the front gap 120 are uniform along the length of the caddy 100 (for example, from the proximal end 114 to the distal end 116). Alternatively, the top gap 118 and the front gap 120 may not be uniform along the caddy 100 (for example, wherein the left wall 102, the right wall 104, the rear wall 106, and/or the front wall 108 may be non-planar and/or disposed non-orthogonally).

The left wall 102 may have a left wall height and a left wall depth. The right wall 104 may have a right wall height and a right wall depth. In one embodiment, the left wall height may be greater than the depth, in another embodiment, the left wall depth may be greater than the height. In a further embodiment, the right wall height may be greater than the depth, in another embodiment, the right wall depth may be greater than the height. As a non-limiting example, as shown in FIG. 1, the left wall depth and right wall depth may be greater than the left wall height and the right wall height, respectively, as to accommodate horizontal storage of lengthy bakeware items. The left wall 102 and right wall 104 may be greater in thickness than the long divider 126 and/or short divider 128. Wall thickness may be provided to enable support, rigidity, and structural integrity such that said walls can support the weight of the bakeware items. As a non-limiting example, the left wall 102, the right wall 104, the rear wall 106, and/or the front wall 106 may have a thickness greater than one or more of the dividers to increase the rigidity of the entire caddy 100. In such a non-limiting example, the thickness of the dividers may be lesser than that of the walls 102-106 as to increase the available volume or floor space within the caddy 100. The walls may further form a rectangular cuboid with sharp edges or rounded edges. The rear wall 106 may have a rear wall height and a rear wall width. The front wall 108 may have a front wall height and a front wall width. In an embodiment, the walls may be covered in fabric. Further, one or more of the walls may be embossed with a logo.

In an embodiment, a strap 112 traverses the front gap 120. In such an embodiment, the strap 112 may be detachably connected to the left wall 102 and/or the right wall 104. In an embodiment, the strap 112 includes a left end 122 and a right end 124. The strap 112 may form a rear loop 113. Further, the strap 112 may be both detachably connected to a wall and/or permanently affixed to a wall. As a non-limiting example, the left end 122 of the strap 112 may be permanently attached to the left wall 102 and the right end 124 of the strap 112 may be detachably connected to the right wall 104. In an embodiment, both ends 122/124 of the strap 112 are permanently attached to the caddy 100. The strap 112 may be sewn to the caddy 100 so that it is located along the perimeter of the caddy 100, in closer proximity to the top gap 118, one fourth the distance of the caddy 100 from the top gap 118. However, the strap 112 may be located anywhere along the perimeter of the caddy 100. In a further embodiment, the rear loop 113 forms a handle to permit the user to accessibly grasp the caddy 100 when lifting it out of its resting place. The strap 112 and rear loop 113 may work in tandem to give the user the option to slide out the caddy 100 from its resting place using the strap 112 to access its contents and/or grasp the rear loop 113 to lift the caddy 100 out of its resting place to be taken to another surface (for example, when accessing more than one item from the caddy 100). As a non-limiting example, the strap 112 may be composed of leather, nylon, cotton, polypropylene, or other suitable materials. The strap 112 may be composed of multiple materials, for example, having a flexible core wrapped by a fabric.

Figure 2:
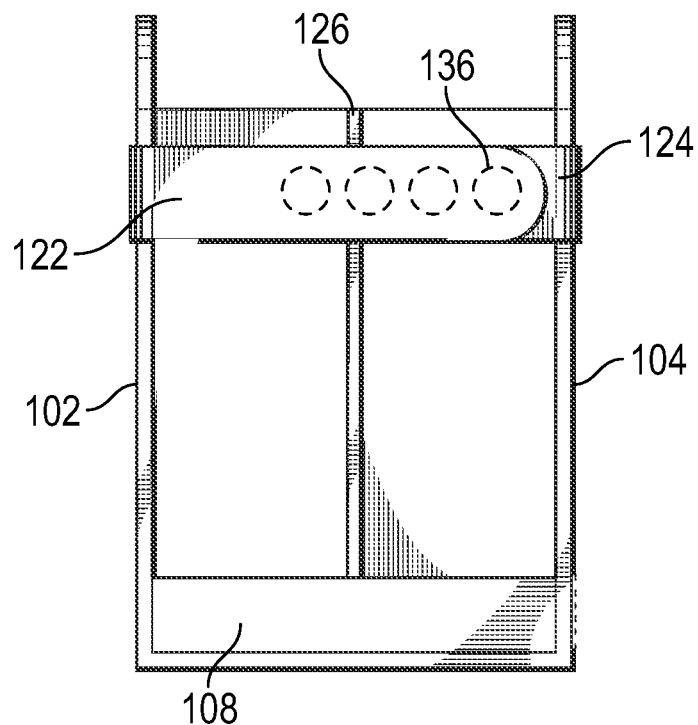
FIG. 2 is a front view of a first embodiment of a bakeware storage caddy.
Figure 3:
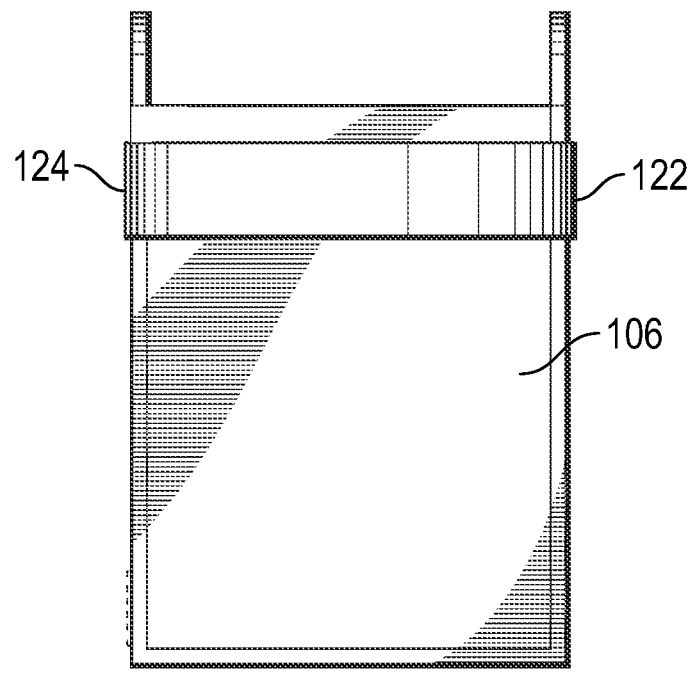
FIG. 3 is a rear view of a first embodiment of a bakeware storage caddy.

In an embodiment, the strap 112 includes one or more magnets 136. The magnets 136 may be embedded in the strap 112, such that the strap 112 adheres to one of the walls. As shown in FIG. 2, the magnets 136 may also be embedded within the strap 112; such that one segment of the strap 112 adheres to another segment of the strap 112. Accordingly, such an embodiment may allow for utilization of a unibody strap (for example, reducing steps in manufacturing and/or producing a strap less inclined to tear). A single magnet 136 may be used, however additional magnets may be used to strengthen the ability of the strap 112 to hold in place the bakeware items. The magnet 136 may be circular in shape to allow for seamlessness within the strap 112, however the magnet may be any shape. In an embodiment, the magnet 136 may be a neodymium magnet (for example, a N52 neodymium magnet), however the magnet 136 may have any strength suitable for storing bakeware items. To enable magnetic coupling, each end 122/124 of the strap 112 may include one or more magnets 136 positioned such that the north poles of magnets disposed in the first end interface with the south poles of magnets disposed in the second end and vice versa. For example, as shown in FIG. 2, the one or more magnets 136 may be embedded in the strap left end 122 and/or the strap right end 124. In one embodiment, the strap left end 122 may include the one or more magnets 136 and the strap right end 124 may include a metallic element and/or magnetic element, such that the strap left end 122 magnetically adheres to the strap right end 124. Alternatively, the strap right end 124 may include the one or more magnets 136 and the strap left end 122 may include a metallic element and/or magnetic element. In an embodiment, the strap end 122/124 containing the one or more magnets 136 may be the end 122/124 disposed most proximal, such that the one or more magnets 136 are further distanced from potentially metallic bakeware items within the caddy 100. Such an embodiment may be configured to reduce unintentional magnetic adherence of a strap end 122/124 to a bakeware item.

The strap 112 may be configured to hold the bakeware pans in the caddies and provide users a handle to pull the bakeware storage caddy 100 out of their cabinet. In an embodiment, the strap 112 may be fastened to the caddy 100 and/or the strap 112 may be fastened to itself via a hook-and-loop fastener, an adhesive, a button(s), a latch, a locking hinge, or other fastener.

Figure 4:
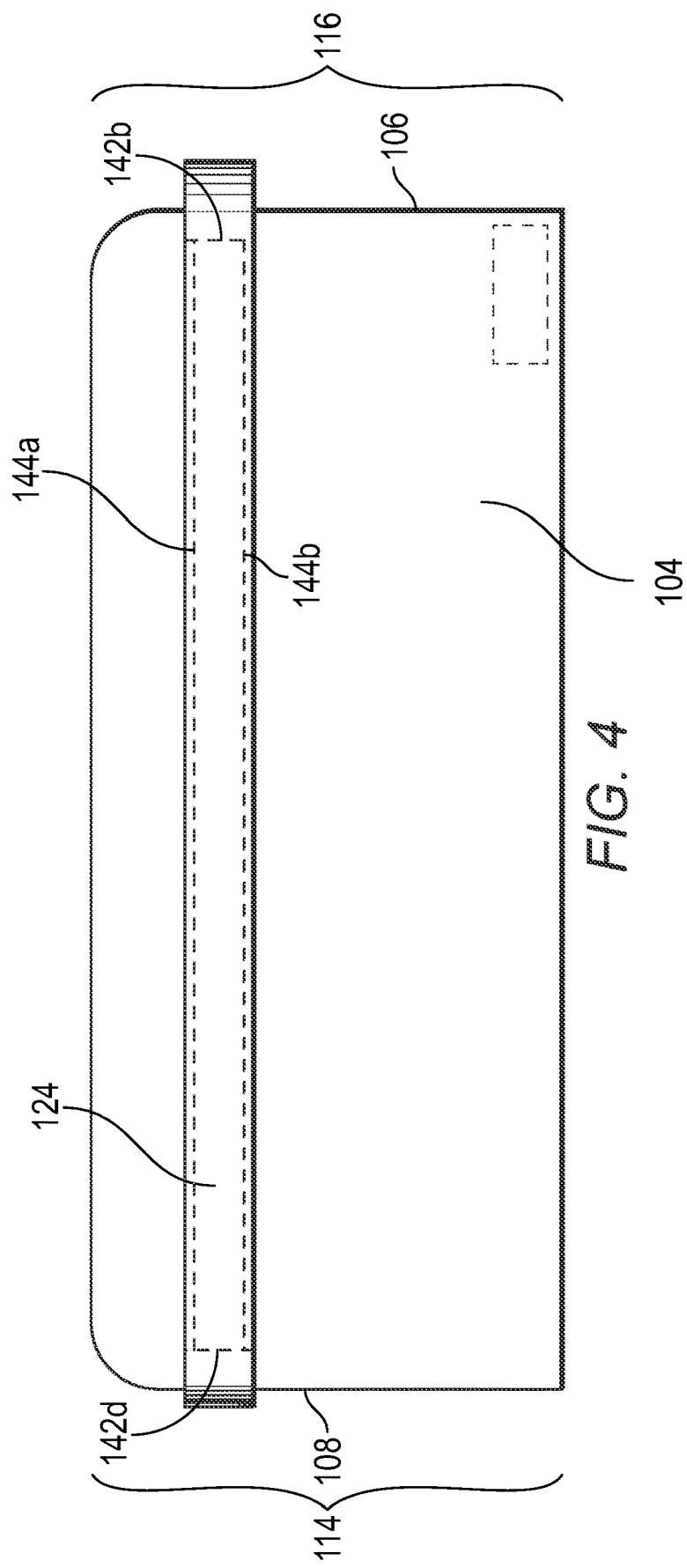
FIG. 4 is a right-side view of a first embodiment of a bakeware storage caddy.
Figure 5:
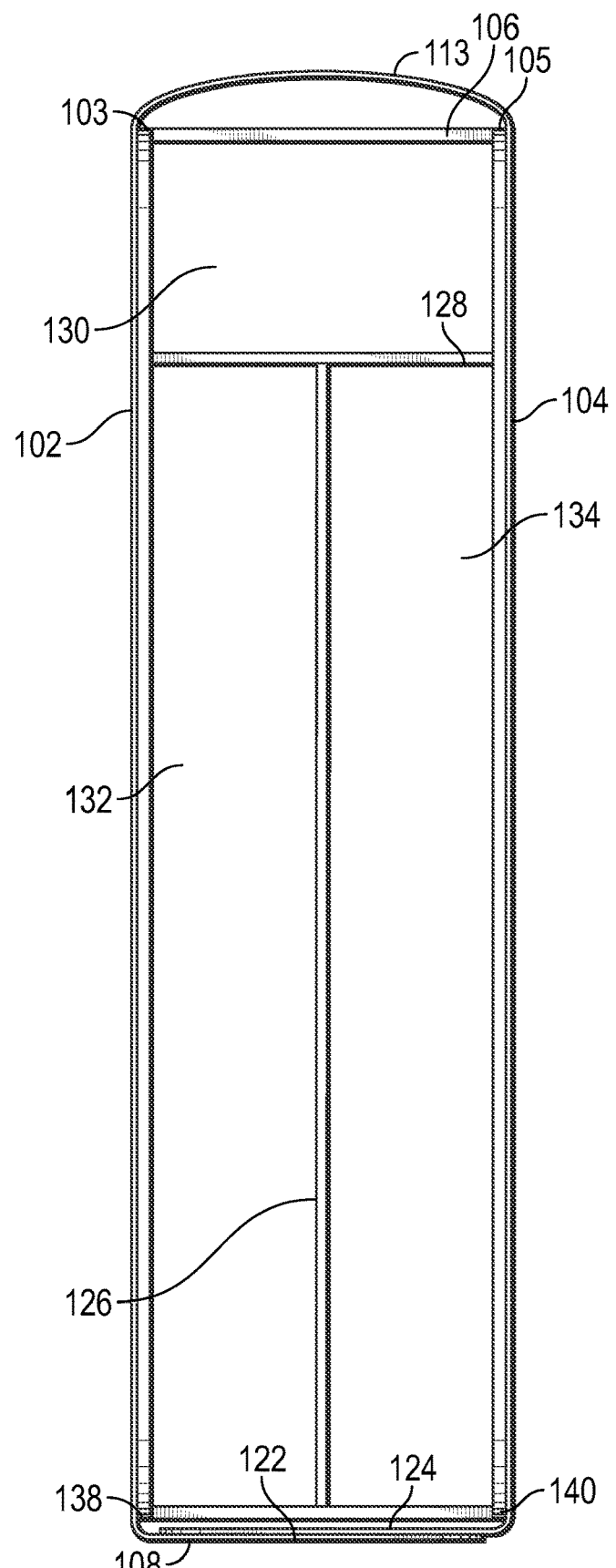
FIG. 5 is a top, elevated view of a first embodiment of a bakeware storage caddy.

Referring to FIG. 4, the strap 112 may include a plurality of right stitches 144 traversing horizontally along the strap 112. The strap 112 may include a top right stitch 144*a* and a bottom right stitch 144*b* where the strap 112 meets the right wall 104. The right stitches 144 may bind the strap 112 to the caddy 100. The top right stitch 144*a* and the bottom right stitch 144*b* may be disposed in parallel. In an alternate embodiment, the strap 112 may be adhered to the right wall 104 with an adhesive. In one embodiment, the stitches 144*a*/144*b* couple the strap 112 to the right wall 104 and/or the fabric (or other suitable material) surrounding the right wall 104.

The strap 112 may include a plurality of left stitches 146 (not shown) traversing horizontally along the strap 112. The strap 112 may include a top left stitch 146*a* (not shown) and a bottom left stitch 146*b* (not shown) where the strap 112 meets the left wall 102. The left stitches 146 may bind the strap 112 to the caddy 100. The top left stitch 146*a* and the bottom left stitch 146*b* may be disposed in parallel. In an alternate embodiment, the strap 112 may be adhered to the left wall 102 with an adhesive. In one embodiment, the stitches 146*a*/146*b* couple the strap 112 to the left wall 102 and/or the fabric (or other suitable material) surrounding the left wall 102.

The strap 112 may have a plurality of vertical stitches 142 comprising a first stich 142*a* (not shown), a second stitch 142*b*, a third stitch 142*c* (not shown), and a fourth stitch 142*d*. The first stitch 142*a* (not shown) may be located a distance from the first juncture 103 along the portion of the strap 112 traversing the left wall 102. As a non-limiting example, the distance may be 2 mm from the first juncture 103. However, the first stitch 142*a* (not shown) may be any suitable distance from the first juncture 103, for example, 15 mm. The distance between the vertical stitch 142 and the respective juncture may be the same for all four vertical stitches 142. In a further embodiment, a second stitch 142*b*, a third stitch 142*c* (not shown), and a fourth stitch 142*d* may be disposed a distance from the second juncture 105, third juncture 138, and fourth juncture 140, respectively. In an alternate embodiment, a vertical segment of glue may be disposed in place or in conjunction with the vertical stitch 142. Each of the vertical stitches 142 may be parallel to the corresponding juncture.

In an embodiment, the vertical stitches 142 act as anchors to the right wall 104 and/or left wall 102 such that when pressure and/or force is applied to the rear loop 113 or the strap 112, the strap 112 tightens around the most proximal and/or most distal edge of the right wall 104 and/or left wall 102 and is anchored by the vertical stitch such that the rear loop 113 or strap 112 have a solid hold on the caddy 100. Such an embodiment may decrease the likelihood of force application from disengaging the stitching of the strap 112 to the caddy 100. Accordingly, the vertical stitches 142 are positioned such as to distribute tension between the vertical stitch 142 and the respective junctures.

The caddy 100 may include one or more dividers. The dividers may be long dividers 126 or short dividers 128. Long dividers 126 may be dividers that extend from the proximal end 114 to the distal end 116 of the caddy 100. Short dividers 128 may be dividers that extend from the left wall 102 to the right wall 104. The long divider 126 may taper from the distal end 116 of the caddy 100 to the proximal end 114 of the caddy 100. The short divider 128 may be orthogonal to the left wall 102 and/or the right wall 104. The long divider 126 may be orthogonal to the front wall 108, the short divider 128, and/or the bottom surface 110. In a further embodiment, the bottom surface 110 of the caddy 100 may have grooves where the long divider 126 or short divider 128 are positioned in the caddy to allow for structural integrity. In an embodiment, the front wall 108, left wall 102, and/or right wall 104 may have vertical grooves to enable the long divider 126 and/or the short divider 128 to lock into place within the caddy 100. The short divider 128 may further contain a groove to enable the long divider 126 to lock into place on the distal end 116. The long divider 126 and the short divider 128 may be removable by the user to accommodate the user's fluctuating baking storage needs. For example, applying a withdrawing force upon the long divider 126 and/or short divider 128 may separate the tabs of the long divider 126 and/or tabs of the short divider 128 from the grooves of the walls and/or the grooves of the bottom surface 110.

In one embodiment, the caddy 100 includes two dividers. As a non-limiting example, the caddy 100 may include one long divider 126 and one short divider 128. The short divider 128 may be disposed between the left wall 102 and the right wall 104 a distance closer to the distal end 116 of the caddy 100. In such an embodiment, a rear pocket 130 may be formed. The rear pocket 130 may be a space contained by the rear wall 106, the left wall 102, the right wall 104, the short divider 128, and the bottom surface 110. In such an embodiment, a long divider 126 may extend from the short divider 128 to the front wall 108 and/or proximal end 114 of the caddy 100. For example, the long divider 126 may begin at the distal end 116 (for example, the position of the short divider 128) with a height equal to that of the short divider 128 and end at the proximal end 114 with a height equal to that of the front wall 108. However, the long divider 126 may also taper completely to the bottom surface 110.

A left pocket 132 may be formed between the left wall 102 and the long divider 126 and a right pocket 134 may be formed between the long divider 126 and the right wall 104. Volumetrically, if the long divider 126 is disposed at the midpoint of the short divider 128, the left pocket 132 and the right pocket 134 may comprise the same volumes. However, the volumes of the left pocket 132, the right pocket 134, and/or the rear pocket 130 may be adjusted as a function of the position of the short divider 128 and/or the long divider 126. The caddy 100 may have a total volume comprising at least the left pocket volume, the right pocket volume, and the rear pocket volume. In one embodiment, the rear pocket volume is less than 20% of the total volume. In another embodiment, the rear pocket volume is less than 40% of the total volume. However, the rear pocket volume may be any suitable fraction of the total volume such that the left pocket 132, the right pocket 134, and the rear pocket 130 may sufficiently house one or more bakeware pieces.

The long divider 126 may be disposed orthogonally to the short divider 128 and the bottom surface 110. The long divider 126 may be formed so that the distal portion of the long divider 126 is the same height as the short divider 128. Alternatively, the height of the distal end of the long divider 126 may be up to 50% shorter than the short divider 128. The long divider 126 may be a right triangle in shape. The long divider 126 may be formed so that the proximal end of the long divider 126 is the same height as the front wall 108. As a non-limiting example, the long divider 126 and the short divider 128 may be sized 3 mm in thickness or more. The dividers 126/128 may be less thick than the walls of the caddy 100. Divider thickness may be sized to provide for structural integrity and further organization within the caddy 100 of bakeware items. In a further embodiment, the long divider 126 may be a greater width than the short divider 128 or the short divider 128 may be a greater width than the long divider 126. In an alternate embodiment, the long divider 126 may be rectangular in shape such that the proximal end of the long divider 126 is the same height as the right wall 104 and left wall 102 and the distal end is the same height as the rear wall 106. The short divider 128 may be rectangular in shape. In an embodiment, the short divider 128 is the same height where the short divider 128 meets the left wall 102 and where the short divider 128 meets the right wall 104. The short divider 128 may be formed such that the height is the same as the left wall 102 and the right wall 104 or may be formed such that the height is up to 50% less than the left wall 102 and right wall 104.

In an embodiment, the long divider 126 and short divider 128 may be transparent. In an alternate embodiment, the long divider 126 and short divider 128 may be opaque. Moreover, the dividers may be covered in fabric to prevent damage to the bakeware items.

The left wall 102 may have a left wall height and a left wall depth. The right wall 104 may have a right wall height and a right wall depth. In one embodiment, the left wall height may be greater than the depth, in another embodiment, the left wall depth may be greater than the height. In a further embodiment, the right wall height may be greater than the depth, in another embodiment, the right wall depth may be greater than the height. The left wall 102 and right wall 104 may be greater in thickness than the long divider 126 and short divider 128. Wall thickness may be provided to enable support, rigidity, and structural integrity such that it can support the weight of the bakeware items. The walls may further form a rectangular cuboid with sharp edges or rounded edges. The rear wall 106 may have a rear wall height and a rear wall depth. The front wall 108 may have a front wall height and a front wall depth. The rear wall height may be greater than the front wall height. The front wall height may be 10% or more the length of the rear wall height.

Figure 6:
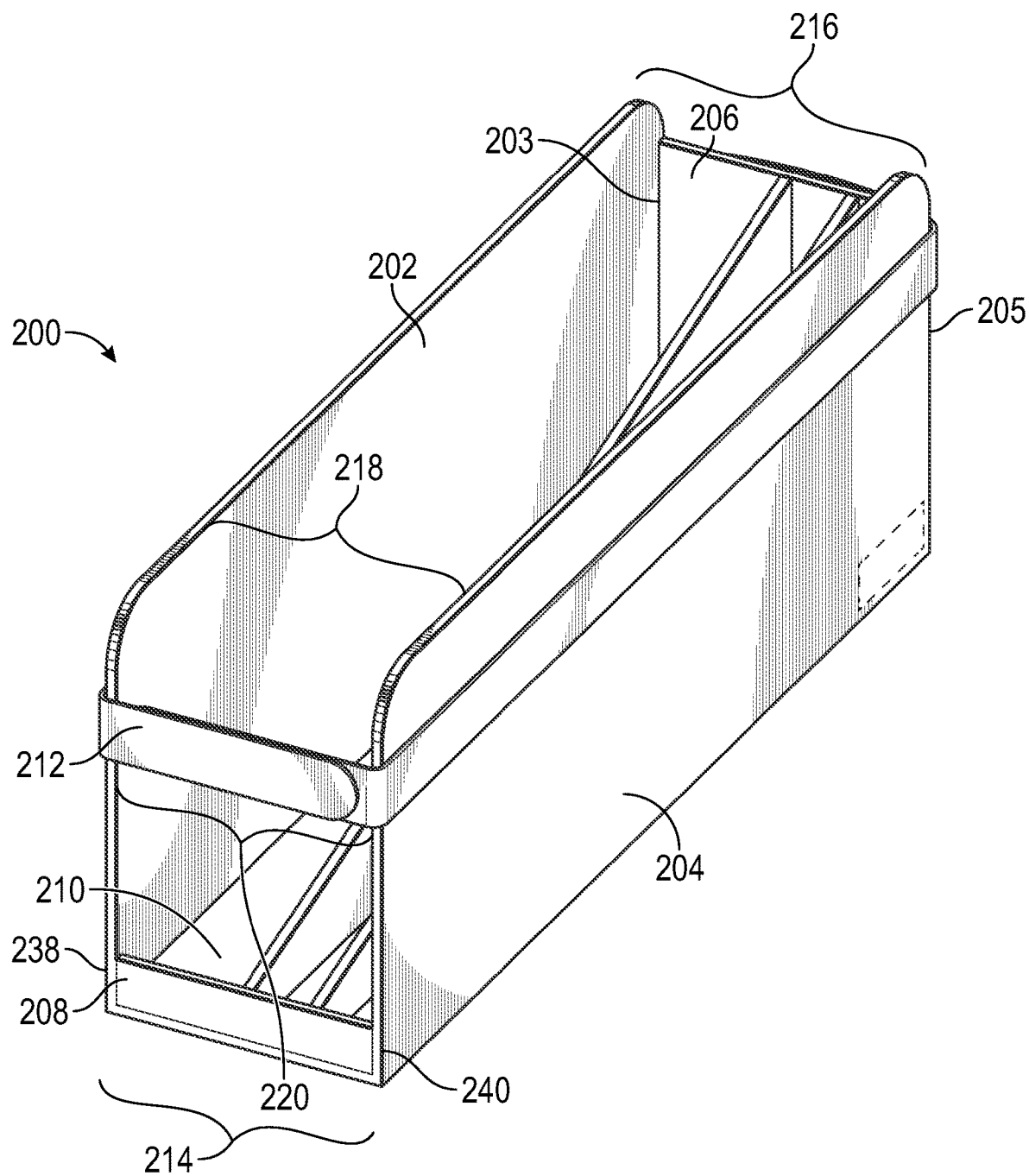
FIG. 6 is a top, front, right elevated side perspective view of a second embodiment of a bakeware storage caddy.
Figure 7:
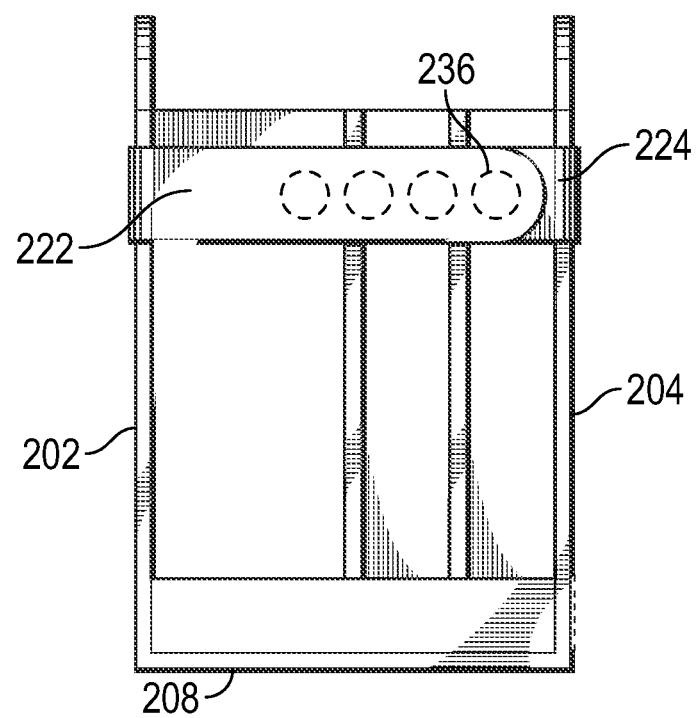
FIG. 7 is a front view of a second embodiment of a bakeware storage caddy.
Figure 8:
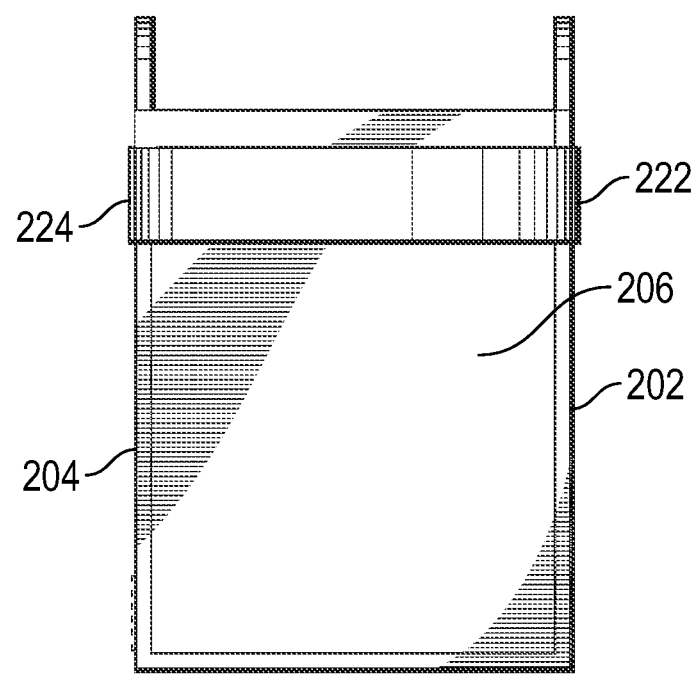
FIG. 8 is a rear view of a second embodiment of a bakeware storage caddy.

Referring to FIG. 6, in a second embodiment, the caddy 200 may include a left wall 202, a right wall 204, a rear wall 206, a front wall 208, and a bottom surface 210. In another embodiment, the caddy 200 also includes a strap 212. In an embodiment, the caddy 200 has a proximal end 214 and a distal end 216. As a non-limiting example, the rear wall 206 may be disposed on the distal end 216 of the caddy 200. In an embodiment, the distal end of the right wall 204 and the distal end of the left wall 202 are joined by the rear wall 206. The right wall 204 and the left wall 202 may include rounded edges or corners. In an embodiment, a first juncture 203 is formed between the left wall 202 and the rear wall 206. In a further embodiment, a second juncture 205 is formed between the right wall 204 and the rear wall 206. The first juncture 203 and second juncture 205 connect the rear wall 206 to the left wall 202 and right wall 204. In a further embodiment, the left wall 202 and the front wall 208 may meet perpendicularly to form a third juncture 238. The right wall 104 and the front wall 208 may meet perpendicularly to further form a fourth juncture 240. The third juncture 238 and the fourth juncture 240 may meet perpendicularly to fasten the front wall 208 to the left wall 202 and the right wall 204, respectively. The junctures may provide adequate support to the caddy 100 so as to enable rigorous support.

In an embodiment, a front wall 208 is disposed on the proximal end 214 of the caddy 200 and may join the proximal ends of the left wall 202 and the right wall 204. The front wall 208 may be substantially shorter than the rear wall 206, the left wall 202, or the right wall 204. As a non-limiting example, the front wall 208 may be roughly 10% the height of the rear wall 206, the left wall 202, and/or the right wall 204. In an embodiment, the caddy 200 does not include a front wall 208.

In an embodiment, a top gap 218 is formed between the top portion of the left wall 202 and the top portion of the right wall 204. A front gap 220 may be formed between the proximal ends 214 of the left wall 202 and the right wall 204.

In an embodiment, a strap 212 traverses the front gap. In such an embodiment, the strap 212 may be detachably connected to the left wall 202 and/or the right wall 204. In an embodiment, the strap 212 includes a strap left end 222 and a strap right end 224. In an embodiment, the strap 212 may form a rear loop 213. Further, the strap 212 may be both detachably connected to a wall and/or permanently affixed to a wall. As a non-limiting example, the left end 222 of the strap 212 may be permanently attached to the left wall 202 and the right end 224 of the strap 212 may be detachably connected to the right wall 204. In an embodiment, both ends of the strap 212 are permanently attached to the caddy 200. The strap 212 may be sewn to the caddy 200 so that it is located along the perimeter of the caddy 200, closer to the top gap 218, one fourth the distance of the caddy 200 from the top gap 218. However, the strap 212 may be located anywhere along the perimeter of the caddy 200. In a further embodiment, the rear loop 213 comprises a handle to permit the user to accessibly grasp the caddy 200 when lifting it out of its resting place. The strap 212 and rear loop 213 may work in tandem to give the user the option to slide out the caddy 200 from its resting place using the strap 212 to access its contents and/or grasp the rear loop 213 to lift the caddy 200 out of its resting place to be taken to another surface (for example, when accessing more than one item from the caddy 200). As a non-limiting example, the strap 212 may be composed of leather, nylon, cotton, polypropylene, or other suitable materials.

In an embodiment, the strap 212 includes one or more magnets 236. The magnets 236 may be embedded in the strap 212, such that the strap 212 adheres to one of the walls. The magnets 136 may also be embedded in the strap 112; such that one segment of the strap 112 adheres to another segment of the strap 112. A single magnet 236 may be used, however additional magnets may be used to strengthen the ability of the strap 112 to hold in place the bakeware items. The magnet 236 may be circular in shape to allow for seamlessness within the strap 112, however the magnet may be any shape. The magnets 236 may also be embedded in the strap 212; such that one segment of the strap 212 adheres to another segment of the strap 212.

The strap 212 may be configured to hold the bakeware pans in the caddy 200 and provide users a handle to pull the bakeware storage caddy 200 out of their cabinet. In an embodiment, the strap 212 may be fastened to the caddy 200 and/or the strap 212 may be fastened to itself via a hook-and-loop fastener, an adhesive, a button(s), a latch, a locking hinge, or other fastener.

For the purposes of this disclosure, features recited in the first embodiment of the caddy 100 may be imported to caddy 200, and features recited in the second embodiment of caddy 200 may be imported to caddy 100. Thus, features as recited in relation to either embodiment should not be read as to limit inclusion of such features to the embodiment of initial recitation.

Figure 9:
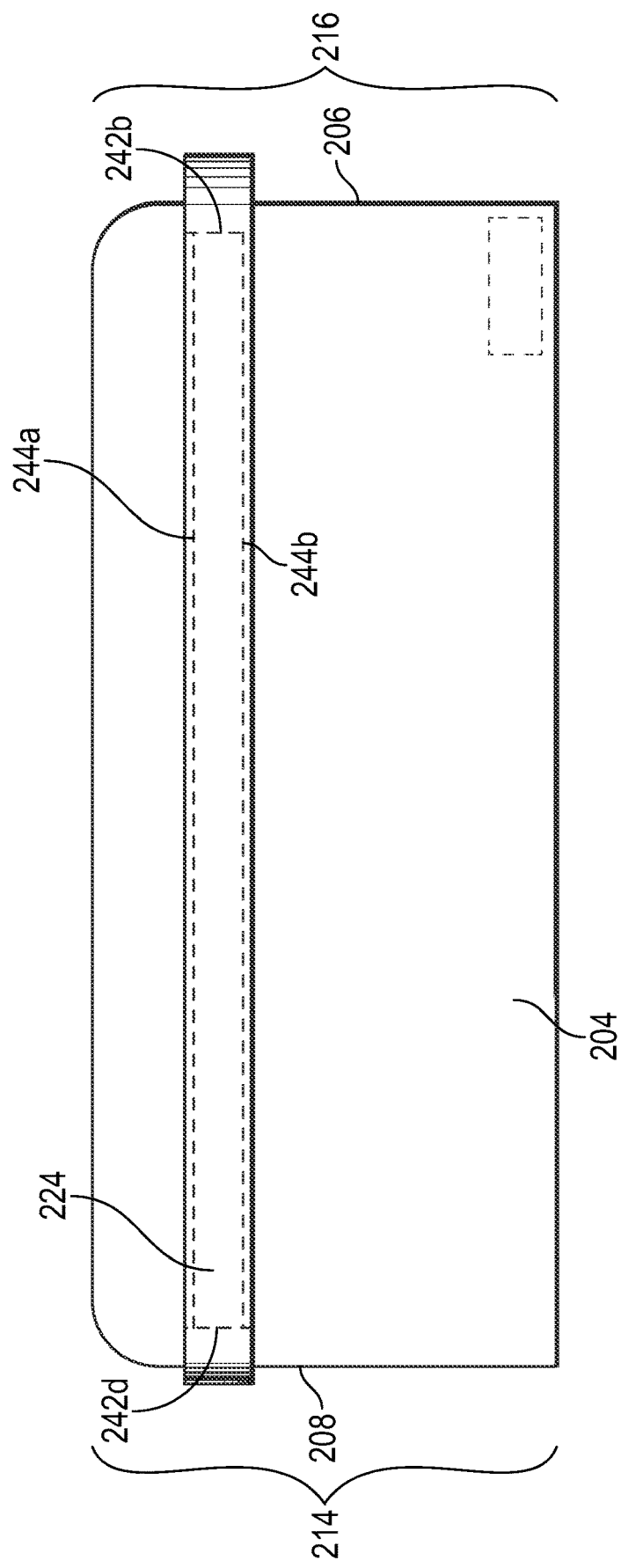
FIG. 9 is a right-side view of a second embodiment of a bakeware storage caddy.
Figure 10:
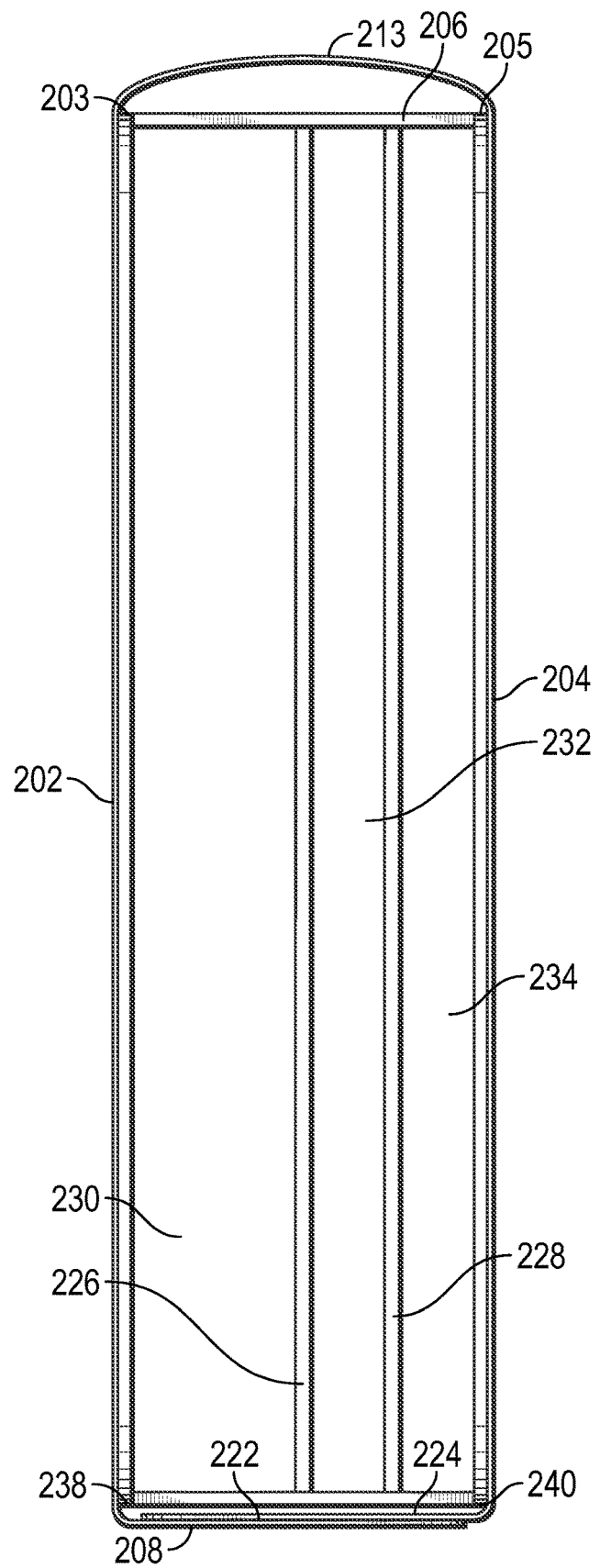
FIG. 10 is a top, elevated view of a first embodiment of a bakeware storage caddy.

Referring to FIG. 9, the strap 212 may include a plurality of right stitches 244 traversing horizontally along the strap 212. The strap 212 may include a top right stitch 244a and a bottom right stitch 244b where the strap 212 meets the right wall 204. The right stitches 244 may bind the strap 212 to the caddy 200.

The strap 212 may include a plurality of left stitches 246 (not shown) traversing horizontally along the strap 212. The strap 212 may include a top left stitch 246a and a bottom left stitch 246b where the strap 212 meets the left wall. The left stitches 246 may bind the strap 212 to the caddy 200. The left stitches 246 may be disposed in a manner identical to that of the right stitches 244 as depicted in FIG. 9, yet disposed on the left wall 202.

The strap 212 may have a plurality of vertical stitches 242 comprising a first stich 242a (not shown), a second stitch 242b, a third stitch 242c (not shown), and a fourth stitch 242d. The first stitch 242a may be located a distance from the first juncture 203 along the portion of the strap 212 traversing the left wall. The distance may be 2 mm from the first juncture 203 or more. In a further embodiment, a second stitch 242b, a third stitch 242c (not shown), and a fourth stitch 242d may be stitched vertically a distance from the second juncture 205, third juncture 238, and fourth juncture 240, respectively. The distance between the vertical stitch 242 and the respective juncture may be the same for all four vertical stitches 242. In an alternate embodiment, the vertical stitches 242 may be replaced or supplemented with vertical segments of adhesive to secure the strap 212 to the caddy 200. The first juncture 203 and the second juncture 205 may be parallel to the most distal edge of the left wall 202 and right wall 204, respectively. The third juncture 238 and fourth juncture 240 may be parallel to the most proximal edge of the left wall 202 and right wall 204, respectively.

In an embodiment, the vertical stitch acts as an anchor to the right and/or left wall such that when pressure and/or force is applied to the rear loop 213 or the strap 212, the strap 212 tightens around the proximal and/or most distal edge of a respective wall and is anchored by the vertical stitch such that the rear loop 213 or strap 212 includes a solid hold on the caddy 200. Accordingly, such an embodiment may decrease the likelihood of force application disengaging the stitching of the strap 212 from the caddy 200.

The caddy 200 may include two dividers. As a non-limiting example, the caddy 200 may include two long dividers. The two long dividers may be disposed parallel to the left wall 202 and the right wall 204. The two long dividers may be positioned orthogonal to the rear wall 106, front wall 108, and bottom surface 210. The two long dividers may taper from the distal end 216 to the proximal end 214. In an embodiment a first long divider 226 is disposed equidistant from the left wall 202 and the right wall 204. The second long divider 228 may be disposed equidistant from the first long divider 226 and the right wall 204. In such an embodiment, the space between the left wall 202 and the first long divider 226 may form a left pocket 230; the space between the first long divider 226 and the second long divider 228 may form a center pocket 232; and the space between the second long divider 228 and right wall 204 may form a right pocket 234. The center pocket 232 and right pocket 234 may be 50% the volume of the left pocket 230. However, the volumes comprising the pockets may be adjusted to accommodate the user's baking needs. In a further embodiment, the bottom surface 210 of the caddy 200 may have grooves where the two long dividers are positioned in the caddy 200 to allow for structural integrity. In an alternate embodiment, the rear wall 206 and front wall 208 may have vertical grooves to enable the two long dividers to lock into place within the caddy 200. The two long dividers may be removable by the user to accommodate the user's fluctuating baking storage needs.

The first long divider 226 and second long divider 228 may form a right angle orthogonal to the bottom surface 210 and rear wall 206. The first long divider 226 and second long divider 228 may be formed such that the distal portion is the same height as the rear wall or may be up to 50% shorter than the rear wall 206. The first long divider 226 and second long divider 228 may be a right triangle in shape. The first long divider 226 and second long divider 228 may be formed such that the proximal end of the long divider is the same height as the front wall 208. As a non-limiting example, the first long divider 226 and second long divider 228 may be sized 3 mm in thickness or more. The first long divider 228 and second long dividers 228 may present the same thickness. The first long divider 226 and second long divider 228 may be less thick than the walls of the caddy 200. Divider thickness may be enabled to provide for structural integrity and further organization of bakeware items within the caddy 200. In a further embodiment, the first long divider 226 may be a greater width than the second long divider 228 or the second long divider 228 may be a greater width than the first long divider 226. In an alternate embodiment, the first long divider 226 and the second long divider 228 may be rectangular in shape so that the proximal end of the long divider is the same height as the right wall 204 and left wall 202 and the distal end is the same height as the rear wall 206. In an embodiment, the first long divider 226 and second long divider 228 may be transparent. In an alternate embodiment, the first long divider 226 and second long divider 228 may be opaque. In an alternate embodiment, the dividers may be covered in fabric to prevent damage to the bakeware items. In a further embodiment, the first long divider 226 and second long divider 228 may have curved edges or sharp edges.

In an alternate embodiment, the caddy may include any number of dividers. Further, the dividers may be positioned in any fashion. The caddy may enable these dividers with corresponding grooves on the walls of the caddy. As a non-limiting example, a caddy may include four long dividers and one short divider. As another non-limiting example, a caddy may include one long divider and two short dividers, where the two short dividers are positioned at the proximal end of the caddy. In alternate embodiments, any number of the dividers may be positioned orthogonal to the left and right wall, parallel to the left and right wall, or angled towards or away the left or right wall. The dividers may be of any height and/or dimensions. The dividers may be any thickness. The dividers may be covered in fabric. The dividers may be transparent or opaque. The dividers may have curved or sharp edges. For example, in one embodiment, a caddy may have a first long divider that is as tall as the left and right walls, a second long divider that is shorter in height than the first divider, and a third long divider that is shorter in height than the second divider. Furthermore, the caddy may include dividers encompassing various angles, heights, slopes, and/or widths.

In one embodiment, the caddy includes two dividers. As a non-limiting example, the caddy may include a long divider and a short divider. The short divider may be perpendicular to the left wall and the right wall. The long divider may run from the short divider to the front wall and/or proximal end of the caddy. In such an embodiment, the long divider may taper from the distal end to the proximal end. The distal end of the long divider may begin on the short divider equidistant to the left wall and the right wall. The proximal end of the long divider may end at the junction of the right wall and the front wall or the proximal end of the right wall. In such an embodiment, the space between the left wall, the right wall, the short divider, the rear wall, and the bottom surface forms a rear pocket; the space between the left wall, the short divider, the long divider, and the bottom surface forms a left pocket; and the long divider, the short divider, the right wall, and the bottom surface form a right pocket. The right pocket may be closed on all but one side.

In one embodiment, the caddy includes two dividers. As a non-limiting example, the caddy includes two long dividers. The first long divider may begin at the rear wall equidistant from the left wall and the right wall. The first long divider may end at the proximal end of the caddy (for example, equidistant from the left wall and the right wall). The second long divider may begin at the rear wall equidistant from the first long divider and the right wall. The second long divider may end at the proximal end of the caddy (for example, at the junction of the front wall and the right wall).

In an embodiment, the caddy may be comprised of plastic, wood, cardboard, or Medium-Density Fibreboard ("MDF"). In an embodiment, the caddy or components of the caddy may include fabric. Fabric may be utilized to prevent bakeware from slipping and/or scratching against adjacent bakeware pieces. MDF may be used to construct the caddy, enabling a rigid structure capable of accepting textile or fabric seamlessly.

Figure 11:
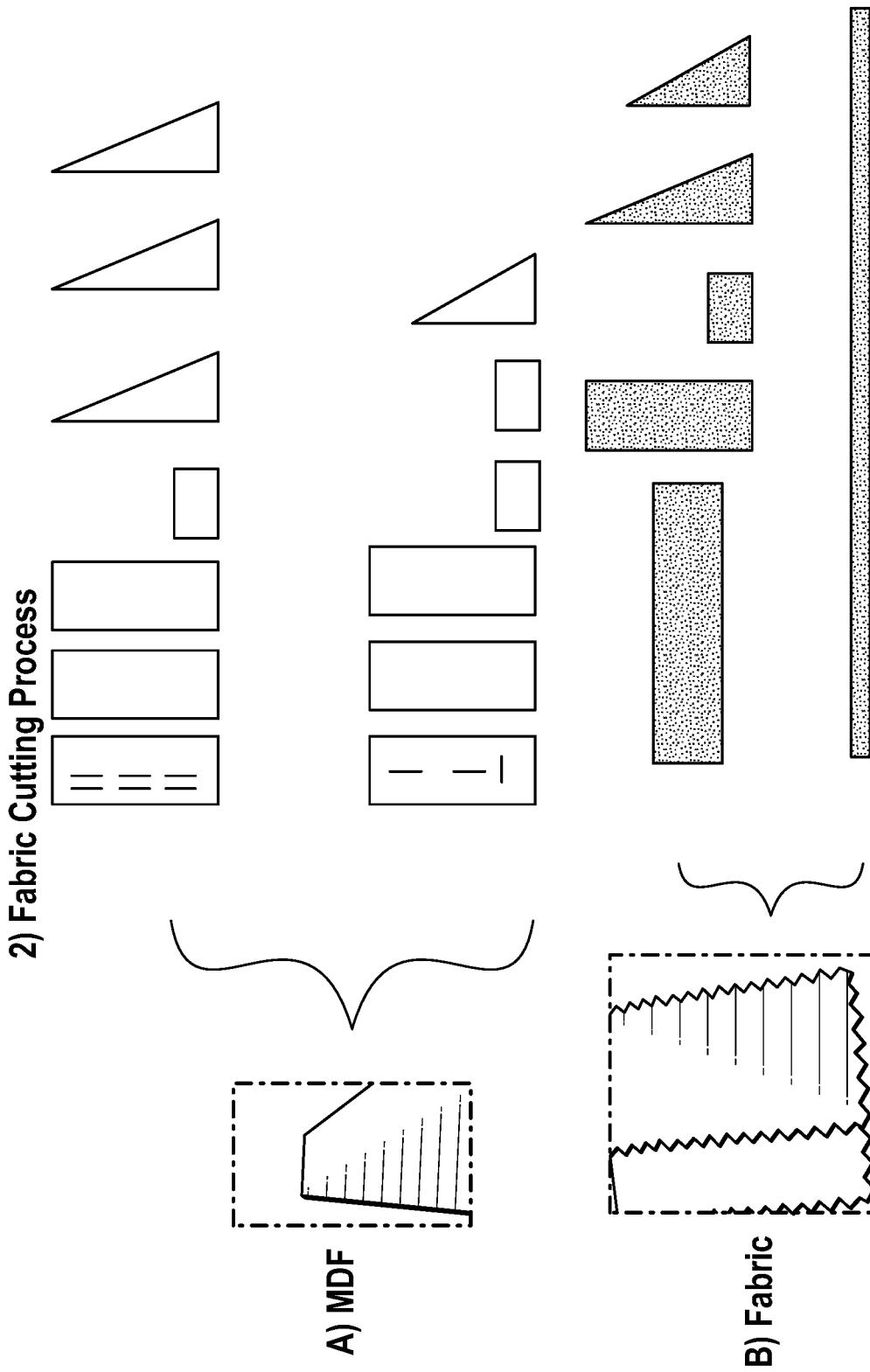
FIG. 11 is an illustration of the material cutting process and components thereof composing an embodiment of the bakeware storage caddy.

Referring to FIG. 11, the invention of the present disclosure may include a method for manufacturing the bakeware system. The first step may include preparing the raw materials (for example, the fabric, MDF, and magnets).

In an embodiment, one step includes a cutting process. The MDF (or other suitable material) may be cut into a plurality of pieces of MDF (for example, the left wall, the right wall, the first divider, etc.). The fabric may be cut into a corresponding plurality of fabric pieces. In such an embodiment, each of the plurality of fabric pieces may be sized to cover at least one of the plurality of pieces of MDF. One piece of fabric may be sized to cover multiple pieces of MDF. In an embodiment, one or more MDF pieces may include tabs or cut-outs (for example, configured to allow easy connection of components).

In an embodiment, a logo may be printed on the strap. In an embodiment, the strap and/or handle may be cut as a fabric strip and glue may be applied. One or more magnets may be positioned on the strap and/or on the sides of the caddy. For example, the magnets may be captured between the strap material and the fabric surrounding the strap material. The fabric may then be pasted onto the body of the caddy.

A computer may auto-stitch the handles. In an embodiment, the plurality of pieces may be assembled. The plurality of pieces may be fastened via an adhesive, for example, glue applied to the tabs and/or grooves.

The fabric may be joined to the MDF and the dividers may be inserted into the caddy. An adhesive/glue may be placed on the back of the fabric material and then interfaced with the MDF. Such an embodiment may require precise shape-cutting and accuracy when applying in production.

The external material may be leather or various blends of polyester and cotton. In an embodiment, the material is waterproof (for example, to promote integrity of the caddy when wet bakeware items are deposited within or adjacent to the caddy). The material may be textured (for example, to promote friction such the bakeware pieces do not move excessively within the caddy). The material may be 720D Catonic Yarn Dyed Fabrics (for example, 1 mm water proof material of 200-210 GSM) and may accommodate a weave pattern for texture. However, in various embodiments, the material may be any suitable material.

The internal dividers may be various thicknesses from 1-5 mm MDF. In an embodiment, the dividers are 3 mm thick (for example, providing rigidity but also allowing for the material to be attached).

For each divider in the bakeware storage, there may be three layers of fabric. There may be a base material with a layer of fabric on each side sandwiching the base layer. This provides an additional layer of strength and rigidity to the divider walls to keep the bakeware pieces standing straight and preventing the walls from bending or collapsing. In alternate embodiments, each divider may include any number of fabric layers (for example, a single layer, two layers, three layers, four layers, etc.).

In an embodiment, the strap allows users to pull out the caddies from their cabinets to access their bakeware, and opens to allow users to access bakeware without pulling caddies directly out. In an embodiment, to achieve this, buttons, snaps, or hook-and-loop fasteners may be used. However, alternatively, a number of magnets (for example, four magnets) may be disposed on the strap. Such a magnet arrangement may provide enough magnetic adherence to enable pulling of the caddy, but still enables the straps to easily connect and disconnect. The strap may have four magnet hole cutouts on the back of the front of the strap. The circular magnets may be added into their respective position and another section or piece of fabric may be glued over said magnets. This may enable the magnets to be embedded in the strap such that the magnets are not visible.

In an embodiment, the slots and/or pockets of the caddies are designed to nest and fit each bakeware piece with some overlapping in the caddies. In an embodiment, fasteners are disposed on the caddies, enabling multiple caddies to be detachably linked to one another.

The caddy may include a back handle. The back handle may be parallel to the front handle such that users can easily pick up the caddies, gripping both handles. In an alternate embodiment, handles are disposed on the two exterior left and right sidewalls (for example, in addition to the front and back handles). The back handle may be sewn at the edges of the distal end of the caddy. In another alternate embodiment, the back handle is also magnetic.

The bakeware storage caddies may be configured in multiple sizes to accommodate small and large bundles of bakeware. A Small Bakeware Bundle may fit 1× Large Baking Sheet (with handles), 1× Medium Baking Sheet, 1x Brownie Pan (with handles), and 1× Muffin Pan. A Large Bakeware Bundle may fit 1× Large Baking Sheet (with handles), 1× Medium Baking Sheet, 1x Brownie Pan (with handles), 1× Muffin Pan, and 1× Cooling Rack. A Large Bakeware Bundle may fit 1× Loaf Pan, 2× Circle Pan, and 1× Square Pan.

The bakeware system may include a 3MM MDF base covered with 720D Catonic Yarn Dyed Fabrics (for example, 1 mm waterproof material of 200-210 GSM); dividers with 3 layers of fabric; six pockets across two storage caddies may fit various bakeware pieces tightly; four (4) N38 magnets on the front strap. The caddy may be 527 mm×146 mm×216 mm. The back handle may be 25 mm distance from body. The caddy may be beige color on the inside and outside with a gray strap and white logo. The logo on side of caddy may be white on a gray stitched square. However, in various embodiments, the color, shape, size, and dimensions of the caddy may differ. The caddy may include any kind of fabric, any number of pockets, and position of pockets, any number of magnets, any number and position of front or back handles, and any stitching or pattern.

Figure 12A:
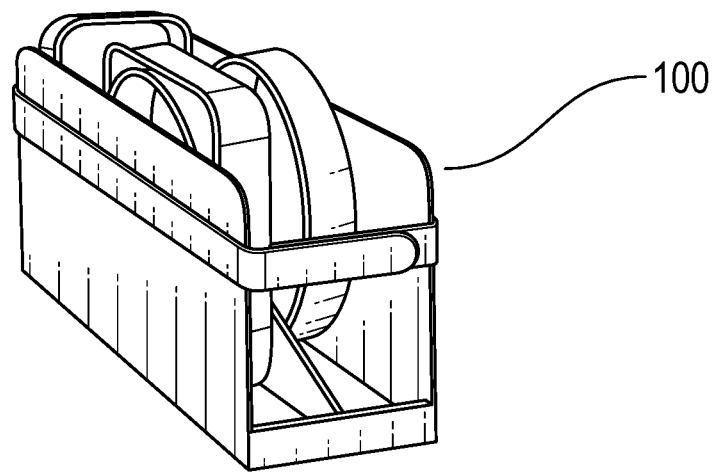
FIGS. 12A-12B illustrate a first embodiment of the caddy in use and a second embodiment of the caddy in use, respectively.
Figure 12B:
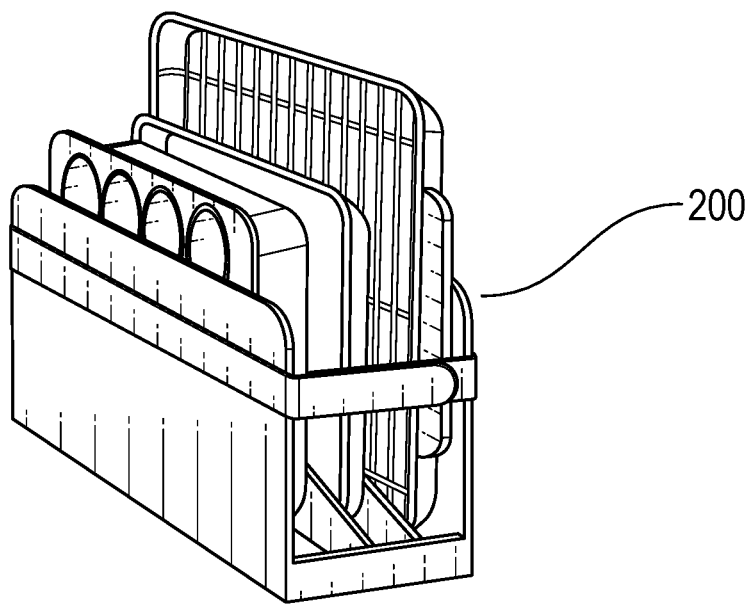

Referring to FIGS. 12A, the caddy 100 may be utilized such that bakeware is disposed within the rear pocket 130, the left pocket 132, and the right pocket 134. For example, the bakeware disposed within the rear pocket 130 may be perpendicular to those pieces disposed within the left pocket 132 and/or the right pocket 134. Referring to FIG. 12B the caddy 200 may be utilized such that bakeware is disposed within the left pocket 230, the center pocket 232, and the right pocket 234. Accordingly, bakeware pieces disposed in the three pockets 230-234 may each be disposed in parallel.

While this invention has been described in conjunction with the embodiments outlined above, many alternatives, modifications and variations will be apparent to those skilled in the art upon reading the foregoing disclosure. Accordingly, the embodiments of the invention, as set forth above, are intended to be illustrative, not limiting. Various changes may be made without departing from the spirit and scope of the invention.

What is claimed is:

1. A bakeware storage system comprising:
   a caddy comprising:
      a left wall, a right wall, a rear wall, a bottom surface, and a front wall, the rear wall forming a first juncture with the left wall and a second juncture with the right wall, both the first juncture connecting the rear wall to the left wall and the second juncture connecting the rear wall to the right wall at an angle between 85 and 95 degrees so that the rear wall is substantially orthogonal to the left and right walls, the front wall forming a third juncture with the left wall and a fourth juncture with the right wall, both the third juncture connecting the front wall to the left wall and the fourth juncture connecting the front wall to the right wall at an angle between 85 and 95 degrees so that the front wall is substantially orthogonal to the left and right walls,
      the left wall, the right wall, the rear wall, the bottom surface, and the front wall covered in a fabric covering;
      a top gap defined by a first space between a top portion of the left wall and a top portion of the right wall;
      a front gap defined by a second space between a proximal end of the left wall and a proximal end of the right wall,
         the top gap and the front gap being uniform along a length of the caddy;
      a short divider covered in the fabric covering, having a short divider length, the short divider orthogonal to the left wall, the right wall, and the bottom surface,
         wherein the short divider length is defined by a first distance between the right wall and the left wall;
      a long divider covered in the fabric covering, having a long divider length, the long divider orthogonal to the short divider, the front wall, and the bottom surface,
         wherein the long divider length is defined by a second distance between the short divider and the front wall,
         wherein the short divider length is less than the long divider length, and
         wherein the long divider tapers from the short divider to the front wall;
      a left pocket formed by the left wall, long divider, front wall, short divider, and bottom surface, the left pocket being a rectangular cuboid in shape, having five sides, being open to the atmosphere on the remaining side;
      a right pocket formed by the right wall, long divider, front wall, short divider, and bottom surface, the left pocket being a rectangular cuboid in shape, having five sides, being open to the atmosphere on the remaining side;
      a rear pocket formed by the left wall, the right wall, the bottom surface, the rear wall, and the short divider, the rear pocket being a rectangular cuboid in shape, having five sides, being open to the atmosphere on the remaining side; and
      a strap covered in the fabric covering traversing the front gap, the strap comprising:
         a first segment,
         a first magnet embedded within the first segment,
         a second segment,
         a second magnet embedded in the second segment,
            wherein the first magnet is configured to reversibly adhere to the second magnet across the front gap to enable opening and closing of the strap.

2. The bakeware storage system of claim 1, wherein the long divider interfaces with a vertical bisection of the short divider, wherein the left pocket comprises a left pocket volume and the right pocket comprises a right pocket volume, and wherein the left pocket volume and the right pocket volume are equal.

3. The bakeware storage system of claim 1, wherein the short divider is disposed in proximity to a distal end of the caddy, wherein the rear pocket comprises a rear pocket volume, and wherein the rear pocket volume comprises no less than 20% of a caddy volume.

4. The bakeware storage system of claim 1, wherein the left wall and the right wall comprise a thickness greater than that of the short divider.

5. The bakeware storage system of claim 1, further comprising a rear loop formed by the strap and the rear wall.

6. The bakeware storage system of claim 1, wherein the strap is secured, via a plurality of vertical stitches and a plurality of horizontal stitches, to the right wall and the left wall.

7. The bakeware storage system of claim 1, wherein the right pocket and the left pocket are greater than 8 inches in length, wherein the rear pocket is greater than 3 inches in length and 5 inches in width.

8. The bakeware storage system of claim 1, wherein at least one of the long divider and the short divider are removable.

9. The bakeware storage system of claim 1, wherein the strap further comprises a plurality of vertical stitches, disposed a distance from the third juncture and the fourth juncture, to anchor the strap to the right wall and the left wall.

10. The bakeware storage system of claim 1, wherein the fabric covering is waterproof.

11. A bakeware storage system comprising:
a caddy comprising:
- a left wall, a right wall, a rear wall, a bottom surface, and a front wall, the rear wall forming a first juncture with the left wall and a second juncture with the right wall, both the first juncture connecting the rear wall to the left wall and the second juncture connecting the rear wall to the right wall at an angle between 85 and 95 degrees so that the rear wall is substantially orthogonal to the left and right walls, the front wall forming a third juncture with the left wall and a fourth juncture with the right wall, both the third juncture connecting the front wall to the left wall and the fourth juncture connecting the front wall to the right wall at an angle between 85 and 95 degrees so that the front wall is substantially orthogonal to the left and right walls,
- the left wall, the right wall, the rear wall, bottom surface, and the front wall covered in a fabric covering;
- a top gap defined by a first space between a top portion of the left wall and a top portion of the right wall;
- a front gap defined by a second space between a proximal end of the left wall and a proximal end of the right wall,
  - the top gap and the front gap being uniform along a length of the caddy;
- a first long divider covered in the fabric covering, having a first long divider length;
- a second long divider covered in the fabric covering, having a second long divider length,
  - wherein the first long divider and the second long divider taper from the rear wall to the front wall, and
  - wherein the first long divider and the second long divider are orthogonal to the front wall, the rear wall, and the bottom surface,
  - wherein the first long divider length and the second long divider length are defined by a distance between the front wall and the rear wall;
- a left pocket formed by the left wall, the first long divider, the front wall, and the rear wall;
- a center pocket formed by the first long divider, the second long divider, front wall, and the rear wall;
- a right pocket formed by the second long divider, the right wall, the rear wall, and the front wall; and
- a strap covered in the fabric covering traversing the front gap, the strap comprising,
  - a first segment,
  - a first magnet embedded within the first segment,
  - a second segment,
  - a second magnet embedded in the second segment,
  - wherein the first magnet is configured to reversibly adhere to the second magnet across the front gap to enable opening and closing of the strap.

12. The bakeware storage system of claim 11, wherein the first long divider interfaces with a vertical bisection of the rear wall; wherein the second long divider is disposed equidistant between the first long divider and the right wall.

13. The bakeware storage system of claim 11, wherein the left wall and the right wall comprise a greater thickness than that of the first long divider and the second long divider.

14. The bakeware storage system of claim 11, wherein the strap is secured via, a plurality of vertical stitches and a plurality of horizontal stitches, to the right wall and left wall.

15. The bakeware storage system of claim 11, further comprising a rear loop formed by the strap and the rear wall.

16. The bakeware storage system of claim 11, wherein the left pocket, the center pocket, and the right pocket comprise a left pocket volume, a center pocket volume, and a right pocket volume, respectively, and wherein the left pocket volume is greater than the center pocket volume and the right pocket volume.

17. The bakeware storage system of claim 16, wherein the center pocket volume and the right pocket volume are equal.

18. The bakeware storage system of claim 11, wherein at least one of the first long divider and the second long divider are removable.

19. The bakeware storage system of claim 11, wherein the strap further comprises a plurality of vertical stitches, disposed a distance from the third juncture and the fourth juncture, to anchor the strap to the right wall and the left wall.

20. The bakeware storage system of claim 11, wherein the fabric covering is waterproof.

* * * * *